April 8, 1969  R. H. MOULT  3,437,610
RESORCINOL-ALDEHYDE RESIN AND POLYESTER
TIRE CORD ADHESIVE MADE THEREFROM
Filed Dec. 27, 1965

INVENTOR.
ROY H. MOULT
BY *William T. Kratz, Jr.*
his Agent

United States Patent Office
3,437,610
Patented Apr. 8, 1969

3,437,610
RESORCINOL-ALDEHYDE RESIN AND POLYESTER TIRE CORD ADHESIVE MADE THEREFROM
Roy H. Moult, Murrysville, Pa., assignor to Koppers Company, Inc., a corporation of Delaware
Filed Dec. 27, 1965, Ser. No. 516,410
Int. Cl. C08g 5/10; C09j 3/12; B60c 9/12
U.S. Cl. 260—3                    9 Claims

ABSTRACT OF THE DISCLOSURE

A novel resin is prepared by the sequential condensation of resorcinol, first with an aldehyde containing 3–6 carbon atoms, such as n-butyraldehyde, and then with formaldehyde. The novel resin is especially useful for use in rubber adhesive dips and provides sufficient wetting and penetration of polyester fibers to enable good bonding of such fibers to rubber.

---

Figure 1:
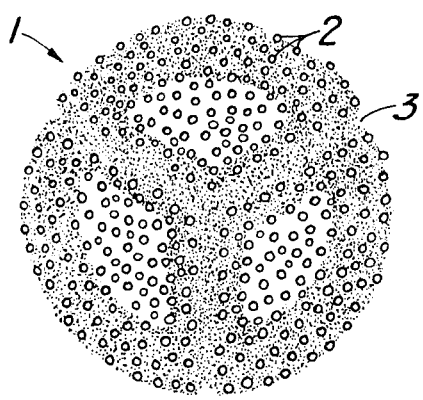

This invention relates to resorcinol-aldehyde resins useful in the preparation of adhesives. In one specific aspect it relates to the resinous condensation of resorcinol with two different aldehydes and the use of this condensation product in an adhesive dip for bonding textile cord to rubber. In a further aspect it relates to the bonding of polyester tire cord to rubber using a new adhesive formulation.

Polyester fiber has many desirable characteristics as a reinforcement for rubber articles. Polyester fibers exhibit a very high tensile strength, absorb less moisture than nylon or rayon, and stretch less than other fibers, resulting in greater dimensional stability of articles reinforced therewith. Also polyester fiber resists heat much better than nylon and rayon, making it an excellent reinforcing article for tires. However, the difficulty of rapidly wetting polyester fibers and hence, adequately penetrating the fiber with aqueous adhesives has resulted in retarding the development of a polyester fiber reinforced tire. Generally, adhesives which have been proposed for the bonding of polyester cord to rubber have been unacceptable to commercial practice either because of insufficient bond strength, poor heat resistance, poor flex life, or difficulty of application.

The most difficult problem to overcome in the treating of polyester cord has been to secure adequate wetting and penetration of the cord, preferably to the depth of 4–5 fibrils, necessary for sufficient bonding to rubber stock. In the Journal of Physical Chemistry, volume 58, June 1954, pp. 503–506, W. A. Zisman et al. reported that, with respect to wetting, polyethylene terephthalate polyester surfaces are, unlike nylon, highly resistant to penetration by water, or other hydrogen-bonding substances, due to the reduced availability of polar groups at the surface. Thus, the aqueous resorcinol resin solutions normally used for rayon or nylon are poor adhesives for polyester tire cords.

I have surprisingly discovered a novel resin made by the sequential condensation of resorcinol, first with an aldehyde containing from 3–6 carbon atoms, and then with formaldehyde, which when used in a rubber adhesive dip, results in sufficient wetting and peneration of polyester fibers to enable bonding of such fibers to rubber tire stock.

It is therefore an object of the present invention to provide a new resorcinol-aldehyde resin useful in the bonding of polyester tire cord to rubber stock. It is a further object to provide a method of making the novel resin and a new tire cord adhesive dip incorporating the resin.

In accordance with the invention my novel resorcinol-aldehyde resin is made by substantially completely reacting, at reflux temperature of the reaction mixture, resorcinol with approximately 0.15 to 0.32 mole of an aldehyde, containing from 3–6 carbon atoms, per mole of resorcinol in the presence of sufficient acid catalyst to lower the pH of the mixture to less than 1.5 and reacting the resulting resorcinol-aldehyde condensation product with 0.35 to 0.48 mole of formaldehyde per mole of resorcinol, optionally in the presence of sufficient water to lower the boiling point of the reaction mixture to at least 105 °C. In the resin preparation, it is necessary that the total amount of combined aldehyde is between 0.5 and 0.8 mole of aldehyde per mole of resorcinol, the amount of aldehyde containing from 3–6 carbon atoms being not more than 40 mole percent of the total amount.

The novel adhesive dip of my invention comprises a rubber latex, the resin solution of the invention, sufficient alkali if necessary to adjust the pH to 7.0 to 13.5, and water of dilution to adjust the solids content to 15–25 percent by weight. The resulting adhesive dip has a latex to resin ratio ranging between 6:1 and 14:1 and may contain, in addition, conventional stabilizers and accelerators. The adhesive dip of the invention is unique in that additional methylene donor, e.g., formaldehyde, is not necessary in the curing of the resin of the adhesive dip, and in fact, has a deleterious effect upon the strength of the bond if used in the curing. Also, a distinct advantage of the adhesive dip is that it requires but a single dip of the cord in the resin as opposed to the more conventional double-tip type adhesives.

The aldehydes containing from 3–6 carbon atoms which are usable in the resin of the invention include propionaldehyde, n-butyraldehyde, isobutyraldehyde, n-valeraldehyde, ethylbutyraldehyde, or crotonaldehyde, with n-butyraldehyde being preferred.

For the purpose of defining the resin preparation, n-butyraldehyde will be used in the following description, but it is to be understood that the above-mentioned aldehydes containing from 3–6 carbon atoms may also be employed in lieu of butyraldehyde.

The order in which the butyraldehyde and formaldehyde are condensed with resorcinol is critical. If the resorcinol is first condensed with formaldehyde, it is impossible to completely react the butyraldehyde with the resorcinol, and the unreacted butyraldehyde causes phase separation problems. Addition of the two aldehydes concurrently also results in insufficient reaction and an incompatible resin solution.

In order to obtain substantially complete reaction between the butyraldehyde and resorcinol, the initial condensation must be carried out at the reflux temperature of the mixture. If lower temperatures are used incomplete reaction results and the resin has diminshed compatibility and adhesion characteristics.

The initial condensation should be carried out in the substantial absence of water, other than that formed during the condensation and that required to dissolve the catalyst, in order to ensure complete reaction. The condensation between the resorcinol and the butyraldehyde must be conducted in the presence of an acid catalyst strong enough to lower the pH of the reaction mixture to below 1.5. Oxalic acid is the preferred catalyst for the reaction although other strong acid catalyst, such as sulfuric acid, benzenesulfonic acid, benzenedisulfonic acid, and phosphoric acid perform satisfactory. In order to obtain complete condensation of both aldehydes, the catalyst must be added during or before the initial condensation of resorcinol with the butyraldehyde.

After the resorcinol-butyraldehyde condensation is substantially complete, the reaction mixture is preferably diluted with sufficient water to lower the boiling point of the mixture to at least 105° C. Formaldehyde is then added in any of its various forms, i.e., Formalin (37 percent aqueous solution), paraformaldehyde, and the like. The water contained in the aqueous formaldehyde solution may serve either in whole or in part as that used to lower the boiling point of the reaction mixture. If paraformaldehyde is used, it is not necessary to lower the boiling point of the reaction mixture and reaction temperatures ranging from about 80° C. to the boiling point of the mixture can be used.

The number of moles of combined aldehyde in the novel resin ranges between 0.5 and 0.8 mole of aldehyde per mole of resorcinol. It is critical that the amount of butyraldehyde is not less than 30 mole percent or more than 40 mole percent of the total amount of aldehyde. Thus, the resins of the invention are made by condensing with resorcinol 0.15 to 0.32 mole of butyraldehyde per mole of resorcinol and 0.35 to 0.48 mole of formaldehyde. If less than 30 mole percent of butyraldehyde is present, the improved bonding strength and flexibility is not obtained. If greater than 40 mole percent of butyraldehyde is present, the compatibility of the dip is decreased.

After the formation of the resin is complete, the solution of resin is made alkaline for use in an adhesive dip. Conveniently, sufficient caustic is added to adjust the pH to 7.0±0.1, although this pH is not critical since a pH of 6.0 to 13.5 can be tolerated in the adhesive dip. Upon addition of a latex having a basic pH to the resin, in forming a dip, the additional caustic is not necessary.

The novel adhesive dip employed in my invention, utilizing a resin prepared from resorcinol, an aldehyde containing from 3–6 carbon atoms, and formaldehyde in a sequential reaction enables rapid and adequate wetting and penetration of polyester fibers for use in bonding to rubber stock.

The reason for the enhanced wettability of the polyester cord is probably due to the existence of alkyl groups in some of the methylene bridges between the resorcinol nuclei, which form the backbone of the resin molecule. These alkyl groups are apparently large enough to screen off a sufficient number of the phenolic hydroxyl groups on the resorcinol nuclei to therefore convert the resin from an extremely hydrophilic substance to one that is more oleophilic. The result is a reduction of the surface tension of the resin to a value approximating, or below, the critical surface tension of the polyester surface.

The accompanying drawing schematically illustrates textile cord treated with an adhesive.

FIGURE 1 illustrates a highly magnified cross-section of a three-ply textile fiber, treated with a dip containing the resin of the invention, showing adequate penetration of resin adhesive for the purpose of bonding such fiber to rubber stock. The three plies 1 are shown to have penetration of resin to the extent of about four to five fibrils 2 in addition to penetration well into the interstice 3.

Figure 2:
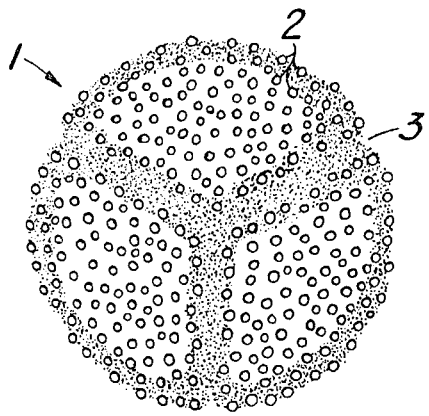

FIGURE 2 illustrates the same three-ply fiber in which penetration with a conventional resin solution having too high a surface tension is attempted, resulting in inadequate wetting and penetration of the fiber, and causing an insufficient bond to rubber stock.

Penetration of the polyester fibers is a function of the surface tension and the viscosity of the resin solution employed. The greater the difference between the critical surface tension of the cord which is to be penetrated and the surface tension of the resin solution, the higher the contact angle i.e., the angle of wetting, with a zero angle (e.g., a continuous film) being desired for sufficient penetration. The problem of wettability is not as apparent with rayon and nylon cords as it is with polyester cords. This is explainable, owing to the higher critical surface tension of rayon and nylon. Rayon has a critical surface tension of 64 and nylon has a critical surface tension of 46, but the critical surface tension of polyethylene terephthalate is lower, being about 43.0. This lower critical surface tension of polyester cord necessitates a lower surface tension in the adhesive dip to allow penetration of the polyester cords.

To exemplify the decreased surface tension of the adhesive dips prepared from the resin of the invention resulting in greater wettability and penetration, in contrast to the wettability and penetration of the resin of my copending joint application Ser. No. 252,559 and a conventional resorcinol-formaldehyde resin as described in Rhodes Patent U.S. 2,385,372 (used as a control) the following test was performed.

Four solutions were prepared, each containing 80 grams of water and 5 grams of resin. The solution contained resins prepared from butyraldehyde, propionaldehyde, paraldehyde and formaldehyde. The viscosity and density of the resulting solution were comparable. A three-quarter inch length of polyester tire cord (1000 denier, three-ply) was dropped from a horizontal rest position, from a height of three inches above the surface of the solution, onto each of the four resin solutions. The results of this test are shown in Table I.

Table I

| Aldehyde used in resin: | Result |
|---|---|
| Butyraldehyde | Sank immediately. |
| Propionaldehyde | Sank immediately. |
| Paraldehyde (Ser. No. 252,559) | Still floating after 1 hour. |
| Formaldehyde (U.S. 2,385,372) | Still floating after 1 hour. |

The results of this test show that when employing a conventional resorcinol-formaldehyde resin the surface tension of the solution is too high to enable rapid penetration and wettability of the polyester cord. Also, the use of the resin of my copending application Ser. No. 252,559 (made with paraldehyde) also results in a solution which does not permit fast penetration and wettability of the polyester fibers. In stark contrast, when employing the resin of the invention, utilizing an aldehyde having three or more carbon atoms, the resulting solution permits sufficiently rapid wetting and penetration of the polyester cords, thus enabling the use of polyester cords treated with such resins in bonding to rubber tire stock.

It is to be noted however that the use of longer chain aldehydes in the resin of the invention is limited to aldehydes having from 3–6 carbon atoms, as aldehydes having greater than 6 carbon atoms result in resin solutions which are not sufficiently soluble in water, thus reducing their usefulness in aqueous adhesive dips.

The tire cord dip of the invention is made by forming an aqueous alkaline solution of resin and latex. The resin solution is merely diluted with sufficient water to reduce the concentration of the adhesive dip to less than about ten percent. The latex (about 41 percent solids) is then added to the resin solution. Depending upon the exact dip solids content desired, additional water may now be added for adjustment. Preferably, about 16 percent total solids is desired. Also, pH adjustment may be made at this point by the addition of an aqueous caustic solution. An alkaline substance, such as sodium hydroxide or ammonium hydroxide is added to the dip to adjust the pH to 7.0 to 13.5. However, if the preformed resin has added thereto a vinylpyridine latex (pH 10.2±0.4) the pH of the dip may not require further adjustment. The dip thus prepared is ready for immediate use, but dips have been used with good results after two week storage, which is beyond normal requirements in commercial practice.

The dip may be formulated with various latices. A vinylpyridine-styrene-butadiene terpolymer latex may be employed as well as hot polymerized (2000 series) styrene-butadiene latex, cold polymerized (2100 series) styrene-butadiene latex, natural latex, reclaimed rubber dispersions, butyl rubber dispersions, or ethylene-propylene terpolymer rubber dispersions.

The adhesive of the invention is proposed specifically for the bonding of polyester tire cords, owing to its increased wetting and penetration of the cords but may alternatively be used for bonding of rayon, nylon, polyolefin, glass, or metal cords to rubber with good results.

The dipped cord may be bonded to various kinds of rubber substrates including natural rubber, styrene-butadiene, polybutadiene, butyl-ethylene-propylene terpolymers, and the new synthetic-natural polyisoprene rubbers.

The resin adhesive dip in aqueous solution normally contains 15–25 percent solids, preferably about 16 percent solids. On a dry basis, the latex to resin ratio ranges between 6:1 and 14:1, preferably between 10:1 and 12:1. Conventional stabilizers such as zinc oxide may be added to the dip as desired.

In dipping, the polyester tire cord is treated under tension with the adhesive dip in a latex dipping machine. The dipped cord is then dried for about 60–120 seconds at 400–500° F., applied to the rubber stock and cured.

The adhesive dip of the invention differs from normal type rayon or nylon adhesive dips in that no additional formaldehyde is added to cure the resin. The resin in the adhesive dip must remain liquid during the cord drying stage until it has had sufficient opportunity to flow into the interstices of the cord. If a measurable amount of formaldehyde is added to the adhesive dip, precuring will ensue and adhesion would be low. A minor amount of formaldehyde may be tolerated, but best results are obtained when no free methylene donor is present. Evidently, the rubber latex in the dip eventually combines with the resin and gives sufficient cross-links to cure the resin without the addition of any additional formaldehyde.

In applying the dip to polyester tire cords, a conventional dipping machine is employed whereby the cord is continuously drawn through the dip bath by system of pulleys, with a minimum of applied tension during its passage through the dip, in order to gain maximum wet pick-up. The excess dip is removed by blowing the cord with air jets, vibration, or by squeezing between rubber rolls, then conducting through a hot air tunnel to dry the cord and raise it to a temperature above 400° F. and up to about 500° F. The preferred temperature has been found to be about 430° F. and an upper limit for the temperature of curing is reached when degradation of the polyester cord results from such increased temperature.

During the hot drying phase of the process, the cord is stretched about 3–4 percent, and exposed for a sufficient time to cure the dip on the cord. The time necessary for the curing period must result in additional time for the penetration of the dip into the polyester cord. An acceptable exposure time of about 60 seconds (at 430° F.) has been found to be suitable.

The successful bonding of rubber to tire cord is measured by the static and dynamic adhesion tests. The H-test has been employed by the rubber industry to determine the static adhesion of textile cords to rubber. This test is specified as A.S.T.M. D-2138-63T and was employed in testing the adhesive of this invention.

The H-test is the method for the measurement of the force necessary to pull a single cord axially from a small block of rubber in which it is embedded. Ideally, the shear strength at the adhesive film-rubber or adhesive film-cord interface would be measured. In performing the test, two small blocks of rubber are bonded by an interconnecting cord to form a specimen which resembles the letter H, thus characterizing the test. The rupture is effected by pulling the specimens apart by means of two hook-type clamps; failure occurs when the bond in either one of the blocks is ruptured.

The data is of course evaluated as to the size of specimen and temperature at which the test is performed.

The rubber tire industry has found that an H-test value in the order of 14 is acceptable for the purpose of bonding textile cords to rubber, using a ¼ inch specimen at a test temperature of 212° F., when bonding polyester tire cord to rubber. Of course, the higher the value of the H-test the better the bond and resulting product.

To evaluate the dynamic adhesion, several methods are available, one method being the Scott Flex Dynamic Adhesion Method. In this test, straps are flexed in a Scott flexing machine at room temperature for a specified time under a specified applied weight. They are then aged one day at room temperature and tested for pull strength in a tension testing machine. The flexed portion of the strap is then compared with an unflexed portion and the percentage loss on flexing calculated. This flex loss is the dynamic adhesion value, with zero percent flex loss being the ultimate desired value.

Figure 3:
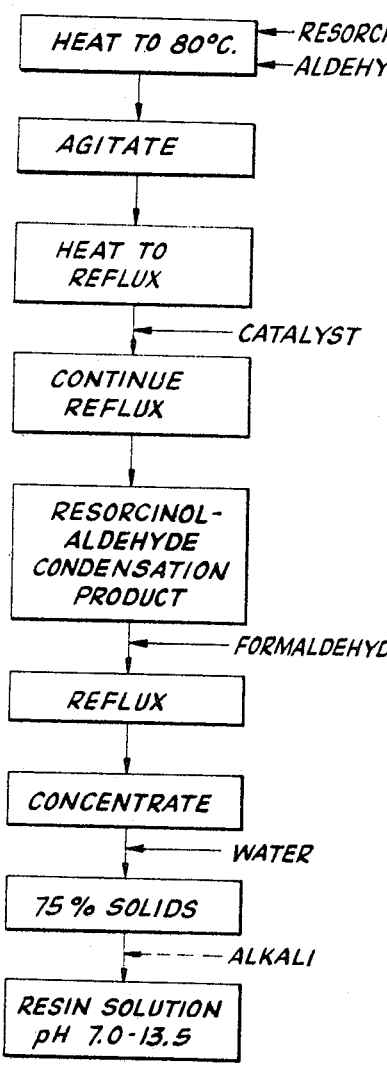

The process for preparing the resins of my invention is illustrated by flow diagram in FIGURE 3.

Figure 4:
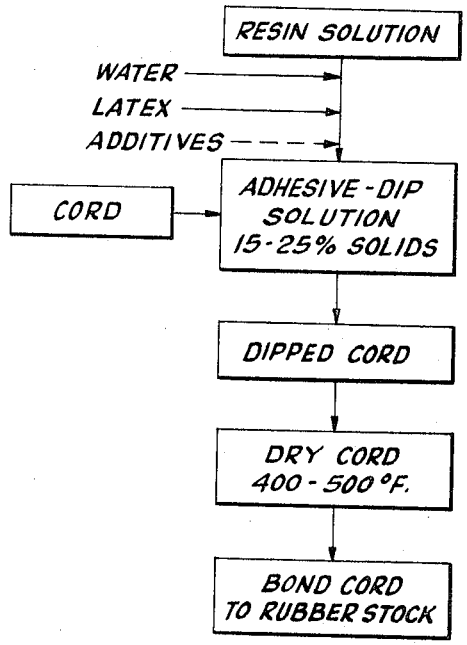

The process for utilizing the resins of my invention in bonding of polyester cords to rubber is illustrated by flow diagram in FIGURE 4.

My invention is further illustrated by the following examples.

EXAMPLE I

A 15-gallon kettle reactor fitted with heating jacket, stirrer and condenser was cleaned and thoroughly purged with nitrogen. To the kettle was added 50.0 pounds (0.454 mole) of resorcinol tech., and 6.21 pounds (0.086 mole) of n-butyraldehyde (0.19 mole butyraldehyde per mole resorcinol). The charge was heated to 80° C., where the reactants liquefied, and agitation was begun. The kettle contents were heated to reflux, a temperature of 107° C. (total time of heat-up 30 minutes) and the catalyst solution (0.29 pound oxalic acid dihydrate in 1.84 pounds of water) was added during eight minutes. The resulting exotherm carried the reflux temperature to 140° C. not withstanding the condenser. After 23 minutes' reaction time the reflux temperature had fallen to 125° C. There was then added 14.34 pounds formaldehyde (as a 37 percent aqueous solution) slowly over a period of 45 minutes. During this addition, the reflux temperature of the reaction fell to 103° C. and the reactants were then refluxed for one hour. The resin solution was then dehydrated by gradually reducing the pressure to 24 inch gauge and heating with jacket steam to 140° C. to remove any unreacted butyraldehyde.

The resin batch was then cooled and sufficient water added to the reactor to cut back the solids content to 75 percent. The pH of the solution was adjusted to 7.1 by the addition of 2.2 pounds of a 50 percent aqueous solution of NaOH.

The resulting resin solution had a viscosity of 48 poises at 25° C. and a final solids content of 74.5 percent.

EXAMPLE II

An adhesive dip for polyester tire cord was made by forming a solution containing 46.2 grams of the resin of Example I (74.5 percent solids), 203.8 grams of a commercial terpolymer latex (vinylpyridine-styrene-butadiene, Gen-Tac latex, 41.6 percent solids) and 270 grams of water. The resulting dip had a total solids content of 23 percent, a resin to rubber ratio of 41 parts per hundred and a pH of 8.1.

The dip was applied to polyester tire cord, Dacron T-68 polyester (1100 denier, 3-ply construction), the dipped cord dried two minutes at 430° F., and adhered to a standard laboratory rubber stock. The dipped cord was molded between plies of rubber stock for 20 minutes at 300° F. molding temperature. Bonded stock thus prepared was evaluated for H-test adhesion and gave a static H-test value of 20.7, using a ¼ inch specimen at a temperature of 212° F.

EXAMPLE III

Resins were prepared according to the process described in Example I, using n-butyraldehyde and propionaldehyde as the aldehyde condensed with resorcinol. The resins were used to form adhesive dips. These adhesive dips were compared with a dip utilizing the resin of Example I of my copending joint application (Ser. No. 252,559) prepared with paraldehyde. A conventional resorcinol-formaldehyde resin prepared generally according to the procedure described by P. H. Rhodes in U.S. Patent 2,385,372 was also utilized in an adhesive dip and used as a control.

The various adhesive dips were used to treat polyester tire cord and the resulting dipped cord bonded to natural rubber stock.

The results of the static H-test adhesion on ¼ inch specimens at 212° F. and Scott-Flex Test values for dynamic adhesion are shown in Table II.

TABLE II

| Aldehyde used in resin preparation | H-test (lbs.) | Dynamic adhesion flex loss (percent) |
|---|---|---|
| Butyraldehyde | 17.6 | 6 |
| Propionaldehyde | 15.2 | 9 |
| Paraldehyde | 13.6 | 27 |
| Control | 11.4 | 31 |

As can be seen from the tests, the use of resins of the invention gave the best results when bonding polyester cord to rubber tock. The use of the adhesive prepared with paraldehyde failed to meet the H-test standard of 14, while the conventional resorcinol-formaldehyde is markedly inferior. Also, the percent flex loss was greatly lowered when using the resins prepared from propionaldehyde and butyraldehyde.

EXAMPLE IV

The resin of Example I was used to form adhesive dips of various dip solids concentration. The dip solids concentration was varied by adding different amounts of water to the dip formulation. The latex, resin to rubber ratio, and pH of the adhesive dips were the same as that of Example II. The dips were used to bond Dacron T-68 polyester tire cord (1000 denier, 3-ply) to conventional laboratory rubber stock and the testing conditions of Example II followed. The results of the variation in dip solids are found in Table III.

TABLE III

| Dip solids content | Drying time (seconds) of dipped cord | H-test ¼ inch specimen, 212° F. |
|---|---|---|
| 16 | 62 | 13.4 |
|  | 99 | 15.9 |
|  | 231 | 23.4 |
| 21 | 62 | 10.1 |
|  | 99 | 16.0 |
|  | 231 | 23.2 |
| 26 | 62 | 11.7 |
|  | 99 | 14.2 |
|  | 231 | 21.7 |
| 12 | 99 | 15.3 |
| 8 | 99 | 99.9 |

The results show that dip solids may be varied, but that about 16 percent is preferable. Also, the longer drying time of the dipped cord before bonding has a substantial beneficial effect upon the resulting bond strength.

EXAMPLE V

The resin dip of Example II was used to treat polyester tire cord in a Litzler machine, and the cord molded in a commercial carcass stock. The cord was passed through the dip at a speed of 20-25 yards per minute at a tension of 60 grams, then through a first dryed (370° F.) for 200 seconds at a tension of one pound; a second dryer (450° F.) for 150 seconds at a tension of seven pounds and a third dryer (370° F.) for 200 seconds at a tension of one pound. The resulting bond showed an H-test value of 22.1 pounds using a ⅜ inch specimen at room temperature. Under this treatment, the cord not only had satisfactory adhesion but good cord characteristic, that is little degradation of the polyester cord.

EXAMPLE VI

The procedure of Example V was followed except that the drying temperatures and tensions in the ovens were 300° F. (one pound), 350° F. (6–7.5 pounds) and 350° F. (one pound). The cord on bonding to rubber stock gave an H-test value on a ⅜ inch specimen at room temperature of 13 pounds, thus showing the beneficial effect of the higher temperature in the drying stage of the cord treatment.

EXAMPLE VII

The procedure of Example V was repeated with additional formaldehyde added to the dip. Approximately 1.5 moles of formaldehyde per mole of resin were added to the dip and the dipped polyester cord dried under the conditions of Example V. The H-Test value dropped to 9.8 to 10.5 pounds for a ⅜ inch specimen at room temperature. It can be readily seen that the resin is adversely affected by the addition of a methylene donor to the resin dip.

I claim:

1. Method of making a resorcinol-aldehyde resin solution comprising:

substantially completely reacting, at a reflux temperature of the reaction mixture, resorcinol with approximately 0.15–0.32 mole of an aldehyde having from 3 to 6 carbon atoms, selected from propionaldehyde, n-butyraldehyde, isobutyraldehyde, n-valeraldehyde, ethylbutyraldehyde and crotonaldehyde, per mole of resorcinol, in the presence of sufficient acid catalyst to lower the pH of the mixture to less than 1.5, and reacting the resulting resorcinol-aldehyde condensation product with 0.35–0.48 mole of formaldehyde per mole of resorcinol at a temperature up to the boiling point of the reaction mixture in the presence of sufficient water to lower the boiling point of the reaction mixture at least 105° C., the total amount of combined aldehyde and formaldehyde being 0.5–0.8 mole per mole of resorcinol and the amount of aldehyde having from 3 to 6 carbon atoms, being not more than 40 percent of said total amount.

2. The resorcinol-aldehyde resin solution prepared by the process of claim 1.

3. The resin solution of claim 2 wherein said aldehyde is n-butyraldehyde.

4. The resin solution of claim 2 wherein said aldehyde is propionaldehyde.

5. The resin solution of claim 2 wherein said aldehyde is isobutyraldehyde.

6. The resin solution of claim 2 wherein said aldehyde is 2-ethylbutyraldehyde.

7. The resin solution of claim 2 wherein there is added a rubber latex, sufficient alkali to adjust the pH of the dip to 7.0–13.5, and sufficient water of dilution to adjust the solids content to 15–25 percent by weight, the dry basis ratio of rubber latex to resin solids being 6:1–14:1, to form a tire cord adhesive therefrom.

8. Rubber-coated textile tire cord prepared by dipping textile tire cord in the dip of claim 7.

9. The rubber coated textile tire cord of claim 8 wherein the textile tire cord comprises polyester fiber.

References Cited

UNITED STATES PATENTS 2,128,635　8/1938　Church et al. _____ 260—29.3
3,242,118　3/1966　St. Clair et al. _____ 260—29.3

SAMUEL H. BLECH, Primary Examiner.

JOHN C. BLEUTGE, Asistant Examiner.

U.S. Cl. X.R.

260—29.3, 846, 54, 848; 156—110, 335; 117—126, 128.4, 128.7, 138.8, 161, 163; 161—231